United States Patent
Martineck, Sr.

(10) Patent No.: US 10,008,074 B2
(45) Date of Patent: Jun. 26, 2018

(54) METHOD AND SYSTEM FOR LINKING WEB-BASED SECONDARY FEATURES TO A LOTTERY TICKET VALIDATION FILE BY AN ENCRYPTED REGISTRATION CODE

(71) Applicant: Scientific Games International, Inc., Newark, DE (US)

(72) Inventor: Jeffrey D. Martineck, Sr., Johns Creek, GA (US)

(73) Assignee: Scientific Games International, Inc., Newark, DE (US)

( * ) Notice: Subject to any disclaimer, the term of this patent is extended or adjusted under 35 U.S.C. 154(b) by 44 days.

(21) Appl. No.: 15/164,316

(22) Filed: May 25, 2016

(65) Prior Publication Data

US 2017/0345251 A1    Nov. 30, 2017

(51) Int. Cl.
*G06F 17/00* (2006.01)
*G07F 17/32* (2006.01)
*H04L 9/32* (2006.01)

(52) U.S. Cl.
CPC .......... *G07F 17/329* (2013.01); *H04L 9/3226* (2013.01)

(58) Field of Classification Search
None
See application file for complete search history.

(56) References Cited

U.S. PATENT DOCUMENTS

| | | |
|---|---|---|
| 5,935,000 A | 8/1999 | Sanchez, III et al. |
| 6,251,017 B1 | 6/2001 | Leason et al. |
| 6,497,408 B1 | 12/2002 | Walker et al. |
| 7,749,080 B2 | 7/2010 | Szrek et al. |
| 8,197,323 B2 | 6/2012 | Bennett, III et al. |
| 9,027,832 B1 | 5/2015 | Rennard |
| 9,355,525 B2 | 5/2016 | Mound |
| 9,633,520 B2 * | 4/2017 | Bennett, III .......... G07F 17/329 |
| 2002/0188845 A1 | 12/2002 | Henderson et al. |
| 2004/0002371 A1 * | 1/2004 | Paquin ............... G06Q 20/0457 463/17 |
| 2004/0023711 A1 * | 2/2004 | Knapp .................. A63F 3/0665 463/17 |
| 2009/0065574 A9 | 3/2009 | Behm et al. |
| 2009/0098023 A1 * | 4/2009 | Smith ................... B01F 9/0001 422/400 |
| 2012/0077561 A1 | 3/2012 | Bettcher et al. |

* cited by examiner

*Primary Examiner* — Ronald Laneau
(74) *Attorney, Agent, or Firm* — Dority & Manning, P.A.

(57) ABSTRACT

A method for authenticating instant lottery tickets in a web-based program that links secondary activities to the tickets includes providing each lottery ticket with a validation code that links the lottery ticket to an electronic validation file in a database that contains a predetermined outcome and status of the lottery. Each lottery ticket is provided with a registration code separate from the validation code, wherein a player uses the registration code to register the lottery ticket in the web-based program. The registration code is an encrypted form of the validation code for each ticket. With a server and upon receipt of the registration code, the registration code is decrypted to determine the validation code. The validation file associated with the decrypted registration code is accessed and, from the validation file, the authenticity and status of the lottery ticket required for a valid entry into the web-based program is determined.

16 Claims, 3 Drawing Sheets

US 10,008,074 B2

METHOD AND SYSTEM FOR LINKING WEB-BASED SECONDARY FEATURES TO A LOTTERY TICKET VALIDATION FILE BY AN ENCRYPTED REGISTRATION CODE

BACKGROUND

Instant (e.g., "scratch-off") lottery tickets are a popular lottery product and a significant source of revenue for various states and other governmental entities. In order to increase the popularity and sales of such tickets, it is becoming increasingly more common to link the tickets to activities other than the single game play embodied on the ticket. For example, many states have established web-based functionalities wherein a player can register the ticket for various secondary activities, such as second-chance drawings for losing tickets, player reward accounts wherein tickets (winning or losing) are registered and accumulate points for subsequent exchange for value, player loyalty programs, and so forth. With these conventional programs, a web address and access code are printed on the tickets, which allow for the player to enter a lottery sponsored site for registering the ticket for the offered programs.

With the conventional systems, the access code or a separate unique registration number provided on the ticket is compared against a database of the complete set of tickets printed for the respective game to achieve at least some degree of authentication of the ticket. This method, however, has a significant drawback in that the lottery is vulnerable to attempts to register unsold or even non-existent tickets. For example, a person having access to the ticket pack in a retail establishment can copy the registration codes from unsold tickets and register the tickets to take advantage of the secondary activities (e.g., point accumulation, drawings, etc.) without ever purchasing a ticket.

In another fraudulent activity referred to in the industry as "fishing", manual or computer-implemented attacks attempt to generate random codes that are accepted by the web-based system. For example, a person having general knowledge of the format of the access code or registration number can generate and submit random codes having the same format with the expectation that at least certain of these fraudulent codes will actually match authentic codes in the system.

The present invention provides a methodology and related system for securely enabling secondary web-based activities linked to individual lottery tickets that avoids the drawback of conventional methods and systems discussed above.

SUMMARY

Objects and advantages of the invention will be set forth in part in the following description, or may be obvious from the description, or may be learned through practice of the invention.

In accordance with aspects of the invention, a method is provided for authenticating instant lottery tickets for entry in a web-based program that links the tickets to secondary activities. Typically, the lottery tickets are delivered to retail establishments as pre-packaged ticket packs. Formats of web-based programs are known, as discussed above, as well as various secondary activities within the program that are unrelated to the primary game component embodied on the ticket. For example, the lottery ticket may be an instant scratch-off lottery ticket wherein the primary game is completed by a player removing a scratch-off layer to view underlying game indicia that reveals the predetermined win/lose status of the ticket. The web-based programs allow the player to enter a registration code printed on the ticket into the program via an Internet-enabled device to register the ticket for any manner of secondary activities, such as a second-chance drawing for losing tickets, accumulation of points in a rewards program, enhanced status in a loyalty program, and so forth. It should be readily appreciated that the present method is not limited to any particular format or style of web-based program, or associated secondary activities linked to a ticket within the program.

The method includes providing each lottery ticket with a validation code that links the lottery ticket to an electronic validation file in a database, such as a database maintained by the lottery authority (e.g., a state lottery authority) or by a lottery service provider contracted by the lottery authority. The validation code may be in barcode, QR code, alphanumeric form, or any other machine readable form. The validation file linked to the ticket contains the highly-secure win/lose status of the ticket, as well as other pertinent information necessary for verification and accountability of the ticket, as well as for redemption of winning tickets, as understood by those skilled in the art.

The method further includes providing each lottery ticket with a unique registration code for entry into the web-based program that is separate from the validation code. A player enters this registration code via a website to register the lottery ticket in the web-based program. The present methodology does not create or require a separate library of registration codes at the recipient server (or elsewhere). The registration code is generated as an encrypted form of the validation code assigned to the respective ticket.

Upon receipt of the registration code from the player, the server decrypts the code to determine the ticket's validation code, which is then used by the server to access the validation file associated with the decrypted registration code. Information in the validation file is then used to verify authenticity and status of the lottery ticket required for a valid entry into the web-based program. For example, an authentic validation code and associated validation file are proof that an actual lottery ticket is being registered in the web-based program, and not a phantom "fishing" ticket. The validation file may also contain a status flag indicating that the lottery ticket was properly delivered to its intended retail establishment and "activated" in the system as ready for sale and subsequent redemption. The validation file may also include a "sold" status flag indicating that the ticket was actually sold after it was activated. All or any combination of these status indicators may be required by the system prior to accepting the registration code for entry into the web-based program.

The encrypted format of the registration code (e.g., the encrypted validation code) is a substantial deterrent to fraudulent attempts to flood the web-based program with computer generated codes in the "fishing" scenario. Without access to the encryption key, the fraudster has relatively no chance of randomly formatting acceptable or recognizable registration codes.

As mentioned, the particular types of secondary activities in the web-based program are non-limiting aspects of the invention. In a particular embodiment, one such activity may be a second-chance drawing for losing lottery tickets only, wherein a losing status of the lottery ticket is confirmed by the validation file associated with the decrypted web access code.

The lottery tickets may be provided to retail establishments as pre-packaged ticket packs wherein, for each such pack, the method includes scanning a pack code unique to the ticket pack and transmitting the pack code to a central lottery server that maintains the validation files. At the lottery server, the lottery tickets within the pack associated with the pack code are electronically activated and a status of the tickets in their respective validation file is changed to reflect the activated status (e.g., a "ready for sale" status). In addition, at the retail establishment, a unique ticket code provided on each lottery ticket (which may be the validation code) is scanned at a time of sale of the individual lottery ticket and transmitted to the central lottery server. At the central lottery server, upon receipt of the ticket code, the method includes confirming that the ticket code is associated with a previously activated ticket and changing status of the ticket in its validation file to reflect a sold status. For entry of the lottery ticket into the web-based program, the method may require that the validation file associated with the decrypted web access code reflect the activated and sold statuses.

The present invention also encompasses various embodiments of a lottery ticket having a primary game embodied thereon, wherein the lottery ticket is further configured for use in a web-based program that links player participation in secondary activities separate from the primary game to the lottery ticket, as discussed above. An embodiment of such a ticket includes game indicia for play of the primary game, such as any manner of instant scratch-off game. A unique validation code is printed on a face of the ticket (e.g., the back or front of the ticket), wherein the validation code links the lottery ticket to an electronic validation file for the ticket stored in a database, as discussed above. For example, the validation file may contain the predetermined win/lose status of the ticket. A separate unique registration code is printed on the same or a different face of the ticket that enables a player to register the lottery ticket in the web-based program via a web enabled device. The registration code is printed on the ticket as an encrypted version of the unique validation code assigned to the lottery ticket. With this ticket configuration, upon receipt of the registration code by a lottery server, the registration code is decrypted to the validation code, which is then used to access the validation file associated with the lottery ticket to determine an authentic status of the lottery ticket for entry into the web-based program.

In a certain embodiment, the lottery ticket may include a printed notice adjacent the registration code informing a holder of the ticket that the registration code is encrypted. Likewise, the ticket may include a printed notice informing a holder of the ticket that ticket must have been previously purchased to enter the ticket in the web-based program.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
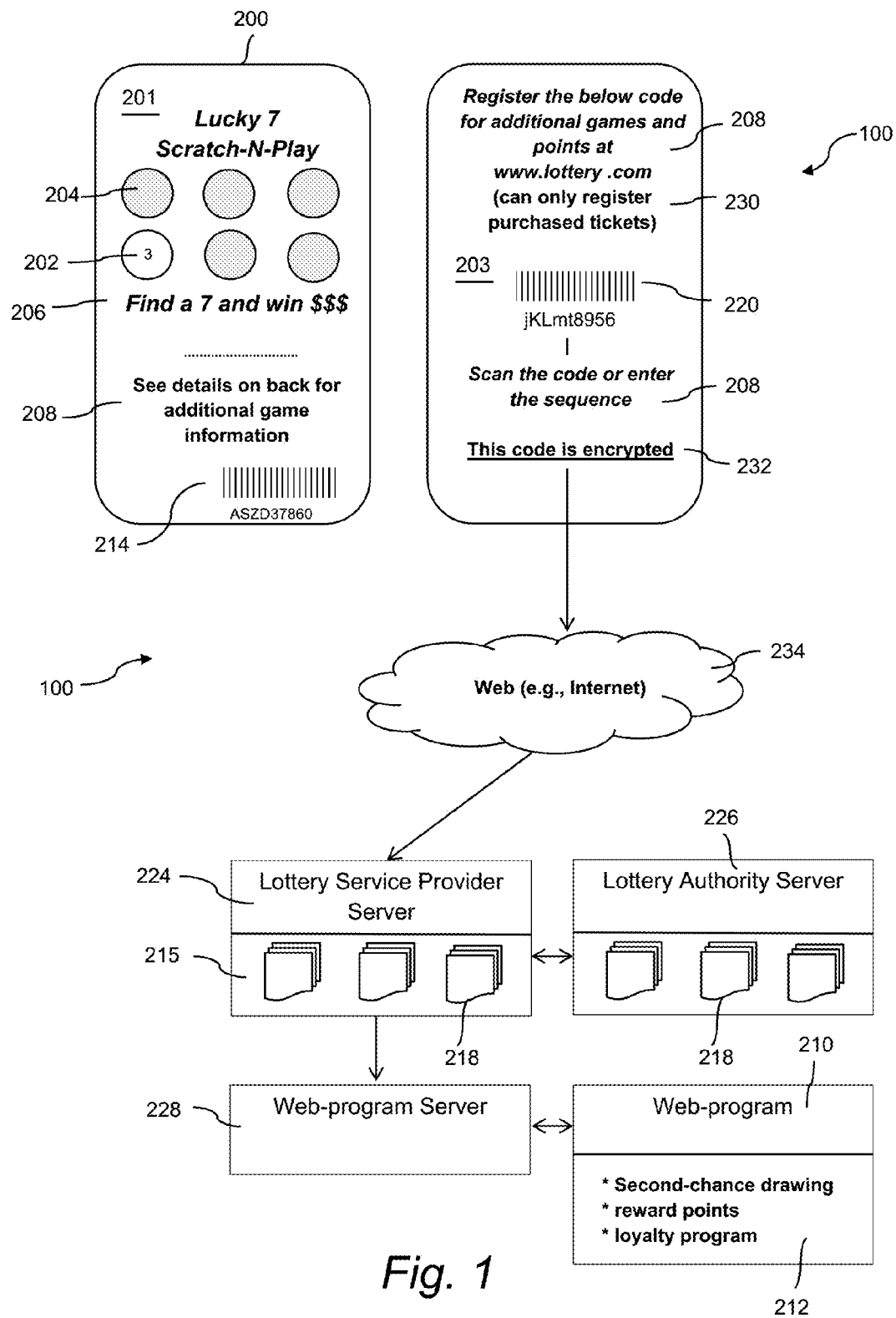
FIG. 1 is a diagram of a method and associated lottery tickets in accordance with aspects of the present invention.
Figure 2:
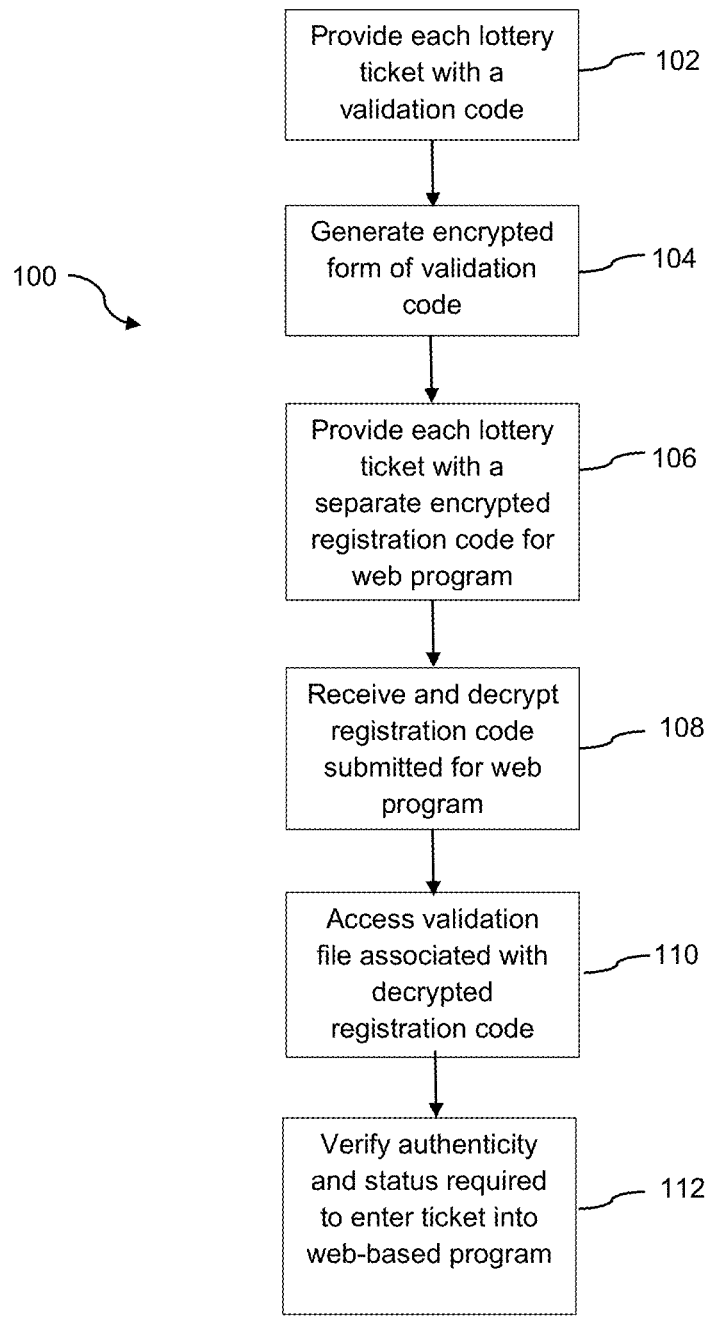
FIG. 2 is a flow diagram of an embodiment of a method in accordance with aspects of the present invention.

FIGS. 1 and 2 depict aspects of a method 100 in accordance with the invention for authenticating instant lottery tickets 200 for entry into a web-based program 210 that links the tickets 200 to any manner of secondary activities 212 within the program 210, such as a second-chance drawing, accumulation of reward points, participation in a loyalty program, and so forth. The lottery tickets 200 may be any manner of instant scratch-off lottery tickets wherein the primary game component is embodied on a front side 201 of the ticket and completed by a player removing a scratch-off layer 204 to view underlying game indicia 208 that reveals the predetermined win/lose status of the ticket. Any manner of game instruction indicia 206 related to the primary scratch-off game component is provided on the ticket. Indicia 208 related to the web-based program 210 may also be provided on the front side 201, as well as on the back side 203 of the ticket. This indicia 208 instructs the holder of the ticket 200 on how to register the ticket 200 in the web-based program.

In step 102 (FIG. 2), each lottery ticket 200 is provided with a unique validation code 214 (FIG. 1) that links the lottery ticket 200 to an electronic validation file 218 in a database, such as a database 215 maintained by the lottery authority server 226 (e.g., a state lottery authority) or by a lottery service provider 224 contracted by the lottery authority. The validation code 214 may be a barcode, QR code, and/or alphanumeric form, for example on the front side 201 of the ticket. As in generally understood in the art, the validation file 218 linked to the ticket 200 contains the highly-secure win/lose status of the ticket, as well as other pertinent information necessary for accountability of the ticket 200 and redemption of winning tickets.

Step 104 depicts that an encrypted form of the validation code 214 provided on each respective ticket is generated and, at step 106, is provided on each ticket as a separate registration code 220, for example on the back side 203 of the ticket 200 (or any other location on the ticket 200). Any manner of conventional encryption algorithm or technique can be used in generation of the registration codes 220, which may also be presented in a barcode, QR code, or alphanumeric format, as depicted in FIG. 1. The holder of the ticket is provided with instructions 208 to enter the registration code 220 via a website to register the lottery ticket 200 in the web-based program 210, for example by the holder scanning the barcode version or entering the alphanumeric version via a mobile smart device that is in communication with the server(s) 224, 228 via a wireless communication network 234, such as the Internet.

At step 108, upon receipt of the encrypted registration code 220, the server 224 for the lottery service provider decrypts the code 220 to determine the validation code. The server 224 may maintain the validation files 218 liked to the validation codes 214 or may have access to the validation files 218 maintained by the lottery authority server 226. In an alternate embodiment, the registration codes 220 may be received and decrypted by the lottery authority server 226, wherein the server 226 has its own set of validation files 218, or the relevant information from the validation file 218 linked to a decoded registration code 220 is forwarded from the lottery service provider server 224. It should be appreciated that the present method 100 is not limited to any particular configuration or relationship between the server(s) that may be used to implement a lottery game between a lottery authority (e.g., a state or other jurisdictional lottery authority) and a lottery service provider (e.g., Scientific Games, International, Inc., having a principal place of business in Alpharetta, Ga.).

FIG. 1 depicts a separate web program server 228 associated with the lottery service provider server 224 for administering the web-based program 210. This server 224, or the functions performed thereby, may be an integral functional component of the server 224.

At step 110, the respective server 224, 226 accesses the validation file 218 associated with the decrypted registration code 220. At step 112, information in the validation file 218 is then used to verify authenticity and status of the lottery ticket 220 required for a valid entry into the web-based program 210. For example, an authentic validation code 214 and associated validation file 218 are proof that an actual lottery ticket is being registered in the web-based program 210, and not a phantom "fishing" ticket. The validation file 218 may also contain a status flag indicating that the lottery ticket 200 was properly delivered to its intended retail establishment and "activated" in the system as "ready for sale." The validation file 218 may also include a "sold" status flag indicating that the ticket 200 was actually sold after it was activated. All or any combination of these status indicators may be required by the system prior to accepting the registration code for entry into the web-based program.

Referring to FIG. 1 in particular, the present invention also encompasses various embodiments of a lottery ticket 200 having a primary game embodied thereon, as discussed above. The lottery ticket 200 is further configured for use in a web-based program 210 that links player participation in secondary activities 212 separate from the primary game to the lottery ticket 200. An embodiment of such a ticket includes game indicia 202 for play of the primary game, such as any manner of instant scratch-off game. A unique validation code 214 is printed on a face 201 of the ticket (e.g., the back or front of the ticket), wherein the validation code 214 links the lottery ticket 200 to an electronic validation file 218 for the ticket stored in a database 215, such as database associated with a service provider server 224 or lottery authority server 226. A separate unique registration code 220 is printed on the same or a different face 203 of the ticket 200 that enables a player to register the lottery ticket in the web-based program 210 via a web enabled device, such as a mobile smart device, a personal computer, and so forth.

The registration code 220 is printed on the ticket 200 as an encrypted version of the unique validation code 214 assigned to the lottery ticket 200. With this ticket configuration, upon receipt of the registration code 220 by a lottery server 224, 226, the registration code 220 is decrypted to reveal the validation code 214, which is then used to access the validation file 218 associated with the lottery ticket 200 to determine an authentic status of the lottery ticket required for entry into the web-based program 210.

In a certain embodiment, the lottery ticket 200 may include a printed notice 232 adjacent the registration code 220 informing a holder of the ticket that the registration code 220 is encrypted. Likewise, the ticket 200 may include a printed notice 230 informing a holder of the ticket that ticket must have been previously purchased to enter the ticket in the web-based program 210.

Figure 3:
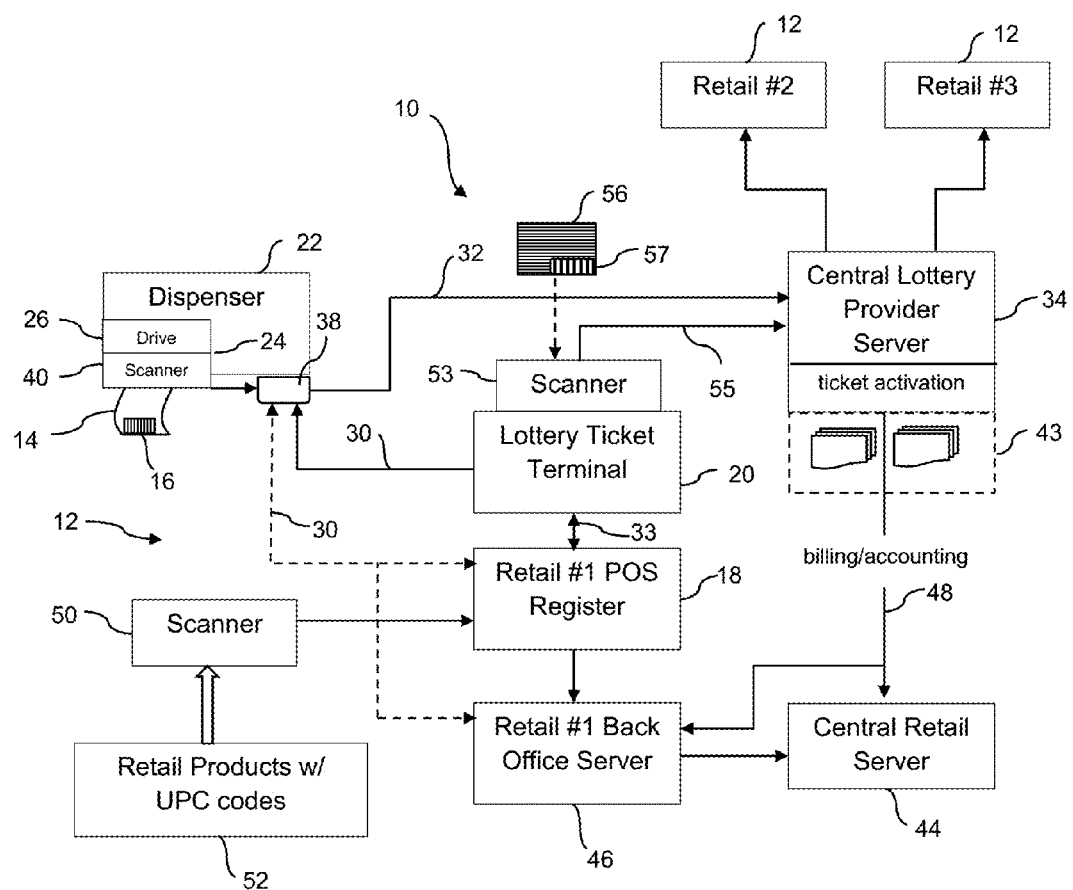
FIG. 3 is a block diagram of a system and associated methodology steps in accordance with aspects of the present invention.

FIG. 3 depicts an embodiment of a system 10 and related methodology for dispensing lottery tickets 14 (corresponding to the tickets 200 discussed above configured for the web-based program) at a retail establishment 12, such as a retail store, convenience store, pub, restaurant, or the like, authorized by a lottery authority (e.g. a state lottery authority such as the Connecticut State Lottery or any other governmental jurisdictional authority) to carry out lottery activities administered by a lottery provider (e.g., Scientific Games, International, Inc., having a principal place of business in Alpharetta, Ga.), such as the sale of instant scratch-off tickets or terminal printed draw tickets for games such as Powerball™.

Although not limited to such, the present system 10 has particular usefulness for larger retail establishments, such as "big-box" retail stores that are part of a national or other geographic chain. In FIG. 3, three separate retail establishments 12 are depicted, with details given for one the establishments. This is for illustrative purposes only. It should be appreciated that the invention encompasses a single retail establishment 12, as well as a multitude of establishments 12, as discussed in greater detail below.

The retail establishment 12 typically includes one or more retail point-of-sale (POS) registers 18 wherein patrons of the establishment 12 purchase goods 52. Typically, a scanner 50 is associated with the POS register 18 to scan a UPC code on the products 52, with the UPC code linked to a purchase price and identification of the products 52, as is well-known in the art.

In the embodiment of FIG. 3, a lottery ticket terminal 20 is configured in wired or wireless communication with the retail POS register 18 to accept a request for purchase of a particular lottery ticket 14 selected from a plurality of different lottery tickets made available to patrons for purchase. This request may be input directly to the terminal 20 or come via the POS register 18, as discussed in greater below. The lottery tickets 14 may be, for example, conventional instant scratch-off lottery tickets. Various types of lottery ticket terminals are known in the art and suitable for configuration with a system 10 in accordance with the invention. For example, Scientific Games Corporation having a principal place of business in Alpharetta, Ga., USA, offers Flair™ and Wave™ lottery ticket terminals that may be readily configured by those skilled in the art for a system as described herein. A patron's request for a particular scratch-off lottery ticket may be inputted into the lottery ticket terminal 20 by a retail clerk or other employee of the retail establishment 12 by various means. For example, the terminal 20 may be configured with a scanner, wherein the clerk scans a "master" having a code corresponding to the particular lottery ticket 14 requested by the patron. Thus, a master would be provided for each type of lottery ticket 14 offered by the establishment 12. In another embodiment, the terminal 20 may be configured with a touch-screen, keyboard, or other data input device, wherein the clerk enters or identifies the ticket 14 requested by the patron.

Still referring to the embodiment of FIG. 3, a "smart" lottery ticket dispenser array 22 is in wired or wireless communication with the terminal 20. This dispenser array 22 may include one or a plurality of individual lottery ticket bins 24, with each bin 24 typically containing a different respective lottery ticket game. For example, one bin may contain "Lucky 7" themed scratch-off lottery tickets 14, while an adjacent bin may contain "Gold Rush" themed scratch-off lottery tickets 14, and so forth.

Each lottery ticket 14 in the different bins 24 includes a unique machine readable code 16 printed thereon, such as a bar code, QR code, or the like. This code 16 may be the validation code 214 discussed above, or a different identifying code, such as a serial number. The type of code 16 may vary depending on the desired information content of the code 14, space on the ticket 14, and so forth. The use of such codes 16 on lottery tickets 14 for various functions related to inventory, identification, verification, and security are well-known.

Referring to FIG. 3, individual ticket packs 56 are delivered to the retail establishment 12. A scanner is associated with the array 22 to read a pack code 57 associated with the pack 56 of lottery tickets upon loading of the pack 56 into the array 22. This code 57 may be, for example, a single code 57 provided with the packaging of the ticket pack. With this embodiment, the scanner 53 provided at or near the lottery terminal 20 may be used to scan the ticket pack code 57 and transmit the code 57 directly to the lottery central server 34 or through the bin controller 38. In an alternate embodiment, the pack code may be the ticket code 16 on the lead ticket 14 in the pack 56, which can also be scanned by the terminal scanner 50 or an individual bin scanner 40 associated with each bin in the array 22 and transmitted to the lottery central server 34 via the bin controller 38. For purposes of the present invention, it is not absolutely necessary that the individual bin 24 in which new ticket packs 56 are loaded be identified, but only the bin array 22. Thus, it many embodiments, the terminal-scanner 50 (which is not associated with any particular bin 24 within the array 24) will suffice for the function initially activating the tickets 14 within a ticket pact 56 to the "ready for sale" status discussed above.

In operation of the system 10 depicted in FIG. 3, the lottery ticket terminal 20 transmits a purchase signal 30 for dispensing a particular lottery ticket 14 that is routed to the respective bin 24 within the dispenser array 22 containing the requested lottery ticket. This purchase signal 30 may be sent to a bin controller 38 associated with the dispenser array 22, with the controller 38 generating a dispense signal that is routed to the proper bin 24 to activate the drive mechanism 26 and dispense the requisite number of lottery tickets 14 from the bin 24. In essence, the bin controller 38 functions as a signal router for the array 22 that ensures that the signal 30 is routed to the correct bin 24.

FIG. 3 also depicts an alternate embodiment wherein the purchase signal 30 is generated by the POS register 18 and transmitted to the bin controller 38 after the POS register 18 receives a purchase code 33 from the lottery ticket terminal 20 corresponding to the particular ticket requested by the patron.

As the tickets 14 are dispensed from the bin 24, the scanner 40 reads the code 16 printed on each ticket. A signal 32 corresponding to the scanned code is generated and routed to a central lottery server 34 (which may correspond to the server 224 depicted in FIG. 1) for each lottery ticket dispensed from the dispenser array 22. In the embodiment of FIG. 3, this signal 32 is generated and transmitted by the bin controller 38, but may also be generated and transmitted by the lottery ticket terminal 20. As mentioned, the code 16 printed on each ticket contains identifying information unique to the ticket, much akin to a serial number assigned to each ticket, and the signal 32 transmitted to the central server 34 enables actions relevant to the sale/dispensing of the individual tickets 14, as well as entry of the tickets into the web-based program as discussed above.

The central lottery server 34 may include a database 43 (which may correspond to the database 215 of validation files 218 in FIG. 1) of all tickets delivered to the respective retail establishments 12, and the near instantaneous identification of dispensed/sold lottery tickets 14 to the server 34 enables various desired functionalities. For example, the individual lottery tickets 14 may remain in a "ready for sale" status upon activation of the ticket packs 56, as discussed above, and only upon generation of a purchase signal 30 and the scanned ticket signal 32 transmitted to the central server 34 is the status of the individual tickets changed in the database 43 (e.g., in the validation file 218 associated with the respective ticket) to "sold" (or similar functional status). The present method may include limiting subsequent redemption or entry of the lottery tickets 14 into the web-based program 210 to only tickets that have this "sold" status in the database 43. Thus, fraudulently obtained tickets (e.g., stolen or otherwise illegally obtained) cannot be redeemed. This is contrary to a conventional practice of activating entire books ("packs") of tickets upon delivery to a retail establishment 12.

The present system 10 and associated method allows for enhanced accountability and crediting of lottery tickets 14 sold at a particular retail establishment 12 by logging each ticket as it is sold and dispensed. For example, the number of tickets 14 sold during a work shift (or other time period) is easily determined by generating a report by the central server 34 of the tickets flagged as sold at any of the retail establishments during any defined time period. The number of tickets 14 sold at any of the retail establishments 12 can be readily reconciled with tickets (e.g., ticket packs) delivered to the establishment. Likewise, the number of tickets 14 dispensed during a defined time can be readily and electronically reconciled with reported purchase transactions from the respective establishment 12, with discrepancies being immediately identified for further investigation.

Another particular advantage of the system 10 and associated method is that billing practices between the retail establishments 12, the lottery authority, and the lottery provider can be based on real-time sales of the lottery tickets 14. For example, the retail establishments 12 can be invoiced on a periodic basis (e.g., daily or weekly) for the actual number of tickets sold (dispensed) at each respective establishment based on the signals 32 routed to the central lottery server 34 instead of upon delivery and activation of ticket packs (or other payment methodology typically in use today).

Another useful function enabled by the present system 10 and associated methods is detection of "gaps" in the sequential numbering of the lottery tickets 14 flagged as sold with the central server 34 from a respective ticket pack 56. Such gaps indicate an improper disposal or possible theft of the missing tickets 14, which the central server 34 can immediately report to the central retail establishment server for further investigation/reconciliation.

The term "server" is used herein to encompass any configuration of computer hardware and software that is maintained by a lottery authority or game provider to carry out the functionalities of the present system 10 and associated method, as well as any manner of additional lottery functions known to those skilled in the art. It should be readily appreciated that the server 34 in FIG. 3 (and servers 224, 226 in FIG. 1) may include an integrated server, or any manner of periphery server or other hardware structure. The central lottery server 34 is typically remote from the retail establishments 12, and is in communication with the establishments 12 via a suitable secure communication network, which may include any manner of wide area network, wireless internet, or cloud computing. The server 34 may be a single networked computer, or a series of interconnected computers having access to the communications network via a gateway or other known networking system. Generally, the server 34 is configured to communicate with, manage, execute and control individual lottery terminal units 20 within the lottery jurisdiction. The server 34 may be a "front end" server provided by the lottery game provider that is interfaced with the existing draw/instant game system infrastructure one or more separate lottery authorities. The server 34 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The server 34 may be directly or indirectly connected through an I/O bus to any manner of peripheral devices such as storage devices, wireless adaptors, printers, and the like. In addition, a database (DB) may be communicatively connected to the server 34 and provide a data repository for the storage and correlation of information gathered from the individual dispenser arrays 22, such as the identity of each lottery ticket 14 dispensed from the array, the time of the dispense sequence, confirmation of ticket activation, and so forth.

It should be appreciated that embodiments of the methods and systems 10 disclosed herein may be executed by one or more suitable networked lottery gaming components and establishment components (e.g., POS register 18, back office server 46) within a plurality of the establishments 12, as well as the remote central server 34. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present system 10 and methods 100 rely on the transmission of data over one or more communications networks. It should be appreciated that network communications can comprise sending and/or receiving information over one or more networks of various forms. For example, a network can comprise a dial-in, public switched telephone network (PSTN), a local area network (LAN), wide area network (WAN), the Internet, an intranet or other type of network. A network may comprise any number and/or combination of hard-wired, wireless, or other communication links.

Referring again to FIG. 3, for embodiments wherein the retail establishments 12 are part of a chain and are operated under the direction of a central office or organization, the central lottery server 34 may be in communication with a central retail server 44 (e.g., a "home office") that is common to such establishments 12. The central lottery server 34 may provide ticket accountability and billing information 48 based on real-time sales of the lottery tickets 14 at scheduled times to the central retail server 44 based on lottery tickets 14 dispensed during defined time periods. The dispensed tickets may have also been activated during the same time period and, as used herein "dispensed" includes tickets that are also activated by the central lottery server 34. For example, the central lottery server 34 may provide to the central retail server 44 a detailed accounting of the number of tickets sold at each individual retail establishment 12 during a defined time period. The lottery server 34 may also provide accountability information related to the number of tickets 14 dispensed versus the number of tickets delivered to each respective establishment, including particularly identifying discrepancies between the number of tickets delivered and the number of tickets dispensed. At its end, the central retail server 44 can compare the number of tickets 14 reported as dispensed to the sales transactions at the respective establishment 12 (reported via a back office server 46 associated with each establishment 12 or directly from the POS registers 18) over the same time period Each retail establishment 12 may include a respective back office server 46 in communication with the retail POS register 18, wherein the central lottery server 34 may also provide accountability and billing information directly to the individual back office servers 46 (as indicated in FIG. 2) based on lottery tickets 14 dispensed at the respective retail establishment 12 during defined time periods.

As mentioned above, the system 10 may be configured with a bin controller 38 that is integrated with the dispenser array 22 or remote from the array 22. This bin controller 38 controls the various functions of the dispenser array 22, including receiving and routing the purchase signals 30 from the lottery ticket terminal 20 or POS register 18 to the correct bins 24, and communicating with the central lottery server 34 and/or the retail establishment back officer server 46 directly or via the central lottery server 34.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method for authenticating instant lottery tickets for subsequent use in a web-based program that links secondary activities to the lottery tickets, the secondary activities independent of a primary lottery game embodied on the lottery tickets and made available to a player for purchasing an authentic one of the lottery tickets, wherein the lottery tickets are provided to retail establishments as pre-packaged ticket packs, the method comprising:

providing each lottery ticket with a validation code on the ticket that links the lottery ticket to an electronic validation file in a database, the validation file containing a predetermined outcome of the lottery ticket and a status of the lottery ticket;

providing each lottery ticket with a registration code on the ticket separate from the validation code, wherein a player uses the registration code to register the lottery ticket in the web-based program, the registration code being an encrypted form of the validation code for each respective ticket;

with a server and upon receipt of the registration code from the player for entry into the web-based program, decrypting the registration code to determine the validation code; and accessing the validation file associated with the decrypted registration code and using the validation file to verify authenticity and status of the lottery ticket required for a valid entry into the web-based program.

2. A method for authenticating instant lottery tickets in a web-based program that links secondary activities to the tickets, wherein the lottery tickets are provided to retail establishments as pre-packaged ticket packs, the method comprising:

providing each lottery ticket with a validation code that links the lottery ticket to an electronic validation file in a database, the validation file containing a predetermined outcome of the lottery ticket and a status of the lottery ticket;

providing each lottery ticket with a registration code separate from the validation code, wherein a player uses the registration code to register the lottery ticket in the web-based program, the registration code being an encrypted form of the validation code for each respective ticket;

with a server and upon receipt of the registration code from the player for entry into the web-based program, decrypting the registration code to determine the validation code;

accessing the validation file associated with the decrypted registration code and using the validation file to verify authenticity and status of the tottery ticket required for a valid entry into the web-based program;

for each pack of lottery tickets delivered to the retail establishment, scanning a pack code unique to the ticket pack and transmitting the pack code to a central lottery server that maintains the validation files;

at the central lottery server, electronically activating the lottery tickets within the ticket pack associated with the pack code and changing status of the tickets in their validation file to reflect the activated status;

at the retail establishment, scanning a unique ticket code provided on each lottery ticket separate from the registration code at a time of sale of the individual lottery ticket and transmitting the ticket code to the central lottery server;

at the central lottery server, upon receipt of the ticket code, confirming that the ticket code is associated with a previously activated ticket and changing status of the ticket in its respective validation file to reflect a sold status; and wherein for subsequent entry of the lottery ticket into the web-based program, the validation file associated with the decrypted registration code must reflect the activated and sold statuses.

3. The method as in claim 2, wherein the ticket code is the validation code.

4. The method as in claim 2, wherein the central lottery server is also the server that receives the registration code.

5. The method as in claim 1, wherein the secondary activities in the web-based program include any one or combination of a second-chance drawing or a point-based reward program.

6. The method as in claim 1, wherein the secondary activity in the web-based program is a second-chance drawing for losing lottery tickets only, wherein a losing status of the lottery ticket is confirmed by the validation file associated with the decrypted registration code.

7. A lottery ticket having a primary game embodied thereon, the lottery ticket further configured for use in a web-based program that links player participation in secondary activities that are independent of play of the primary game to the lottery ticket, comprising:

game indicia for play of the primary game;

a unique validation code printed on a face of the ticket, the validation code linking the lottery ticket to an electronic validation file for the ticket stored in a database, wherein the validation file contains a predetermined win/lose status of the ticket;

a separate unique registration code printed on the same or a different face of the ticket that enables a player to register the lottery ticket in the web-based program via a web enabled device;

the registration code printed on the ticket being encrypted version of the validation code assigned to the lottery ticket, the registration code thereby linked to the validation file and status indicators contained in the validation file for the lottery ticket; and wherein upon receipt of the registration code by a lottery server, the registration code is decrypted to the validation code that is used to access the validation file associated with the lottery ticket to determine authenticity and a required status of the lottery ticket for entry into the web-based program.

8. The lottery ticket as in claim 7, wherein the registration code and validation code are printed on opposite faces of the lottery ticket.

9. The lottery ticket as in claim 7, further comprising a printed notice on the lottery ticket adjacent the registration code informing a holder of the ticket that the registration code is encrypted.

10. The lottery ticket as in claim 7, wherein the registration code provides access to an activated and sold status indication of the lottery ticket in the associated validation file.

11. The lottery ticket as in claim 10, further comprising a printed notice on the lottery ticket adjacent the registration code informing a holder of the ticket that ticket must have been previously purchased to enter the ticket in the web-based program.

12. A method for authenticating instant lottery tickets in a web-based program that links secondary activities to the lottery tickets, the secondary activities independent of a primary lottery game embodied on the lottery tickets and made available to a player for purchasing an authentic one of the lottery tickets, wherein the lottery tickets are provided to retail establishments as pre-packaged ticket packs, the method comprising:

providing each lottery ticket with a validation code on the lottery ticket that links the lottery ticket to an electronic validation file in a database, the validation file containing a predetermined outcome of the lottery ticket and a status of the lottery ticket;

providing each lottery ticket with a registration code on the lottery ticket separate from the validation code, wherein a player uses the registration code to register the lottery ticket in the web-based program, the registration code being an encrypted form of the validation code for each respective ticket;

with a server and upon receipt of the registration code from the player for entry into the web-based program, decrypting the registration code to determine the validation code;

accessing the validation file associated with the decrypted registration code and using the validation file to verify authenticity of the lottery ticket required for a valid entry into the web-based program and confirming from status flags in the validation file that the lottery ticket was previously activated for sale by the retail establishments and was previously sold at one of the retail establishments.

13. The method as in claim 12, wherein the ticket code is the validation code.

14. The method as in claim 12, wherein the central lottery server is also the server that receives the registration code.

15. The method as in claim 12, wherein the secondary activities in the web-based program include any one or combination of a second-chance drawing or a point-based reward program.

16. The method as in claim 12, wherein the secondary activity in the web-based program is a second-chance drawing for losing lottery tickets only, wherein a losing status of the lottery ticket is confirmed by the validation file associated with the decrypted registration code.

\* \* \* \* \*